United States Patent [19]
Doron et al.

[11] Patent Number: 5,220,792
[45] Date of Patent: Jun. 22, 1993

[54] METHOD OF AND MEANS FOR EXTRACTING HEAT FROM A HOT FLUID CONTAINING FOREIGN MATERIAL THAT INTERFERES WITH HEAT TRANSFER

[75] Inventors: Benjamin Doron, Jerusalem; Gad Assaf, Rehovot; Uriyel Fisher, Haifa; Evgeny Aronov, Rehovot, all of Israel

[73] Assignee: Ormat Turbines (1965) Ltd., Yavne, Israel

[21] Appl. No.: 947,959

[22] Filed: Sep. 21, 1992

Related U.S. Application Data

[63] Continuation of Ser. No. 737,133, Jul. 29, 1991, Pat. No. 5,148,677, which is a continuation-in-part of Ser. No. 443,683, Nov. 29, 1989, abandoned, which is a continuation of Ser. No. 128,824, Dec. 4, 1987, Pat. No. 4,894,993.

[51] Int. Cl.$^5$ .............................................. F03G 4/06
[52] U.S. Cl. .................................. 60/641.5; 60/641.2; 60/641.8; 165/45
[58] Field of Search ................ 60/641.2, 641.5, 641.8; 126/415; 165/45

[56] References Cited

U.S. PATENT DOCUMENTS

4,370,860  2/1983  Assaf .
4,492,083  1/1985  McCabe et al. .
4,719,759  1/1988  Zaslavsky .
4,894,993  1/1990  Assaf et al. .

Primary Examiner—Allen M. Ostrager
Attorney, Agent, or Firm—Sandler Greenblum & Bernstein

[57] ABSTRACT

A method is provided for extracting heat from a hot liquid containing scaling material whose solubility is proportional to the temperature of the liquid. The method includes providing a pond containing a liquid, and locating in said pond a vertical tube having an upper end that is substantially closed, and an open lower end immersed in the liquid in the pond and spaced from the bottom thereof for establishing a trapped region above a column of liquid in the the tube. Hot liquid is supplied to the trapped region, and the pond and the tube are constructed and arranged so that the liquid in the pond and the liquid in the column are in substantial hydrostatic equilibrium. As a consequence, the trapped region is maintained at a pressure such that some of the liquid supplied to said trapped region flashes into a vapor thereby concentrating the liquid in the column. Finally, the open lower end of the tube effects the passage to the bottom of the pond of scaling material that precipitates as a consequence of the concentration of liquid below the trapped region.

20 Claims, 7 Drawing Sheets

METHOD OF AND MEANS FOR EXTRACTING HEAT FROM A HOT FLUID CONTAINING FOREIGN MATERIAL THAT INTERFERES WITH HEAT TRANSFER

RELATED APPLICATION

This application is a continuation of Ser. No. 07/737,133, filed Jul. 29, 1991, now U.S. Pat. No. 5,148,677; which application was a continuation-in-part of Ser. No. 07/443,683, filed Nov. 29, 1989, now abandoned; which application was a continuation of Ser. No. 07/128,824, filed Dec. 04, 1987, now U.S. Pat. No. 4,894,993.

TECHNICAL FIELD

The present invention relates to method of and means for extracting heat from a hot fluid containing foreign material that interferes with heat transfer, and more particularly, to a method of and means for extracting heat from geothermal brines containing salts and/or silica compounds, or from gases containing entrained particulates, or from gases containing noxious compounds, such as flue gases.

BACKGROUND OF THE INVENTION

The number of power plants utilizing geothermal brine as a heat source is increasing annually. In most cases, geothermal artesian steam, or steam flashed from hot geothermal brine, is applied to steam turbines that drive electrical generators. In many locations, the geothermal brine contains a significant amount of dissolved scaling material whose solubility is proportional to the temperature of the solution.

A major concern in many plants is the presence of salts and/or silica in geothermal brine, and the possibility of its precipitation in the various components of the power plant as the brine cools during its flow through the plant, or in piping conveying the spent brine to a reinjection well, or even in the reinjection well itself, if this option is used. Such precipitation fouls, and may even block flow through, various heat exchangers requiring expensive cleaning operations that may involve shut-down of the plant.

Precipitation of salts and/or silica is particularly troublesome when steam is produced from brine by flashing because the flashing operation simultaneously cools the brine and increases its concentration. Consequently, such geothermal power plants are usually limited to medium and high temperature geothermal sources (e.g., above about 160° C.) because the temperature of the brine throughout the plant will be high enough to prevent precipitation in various parts of the power plant, of salts and/or silica which is a primary constituent in most geothermal brines.

In order to utilize lower temperature geothermal sources, it is conventional to transfer heat in geothermal brine via a heat exchanger to an organic fluid thereby cooling the brine and vaporizing the organic fluid which is then expanded in a turbogenerator to produce power and heat depleted vapor. An air or water cooled condenser condenses the vapor exhausted from the turbogenerator and returns the resultant condensate to the heat exchanger, whereupon the cycle repeats. The cooled brine is generally piped to a reinjection well and returned to the ground. In such cases also, the brine is always maintained at a temperature above which salts and/or silica precipitation occurs.

In some cases, the salts and/or silica present in the geothermal brine in the source well is at saturation thus preventing any use of the brine in a power plant because cooling of the brine as it is flashed or as it enters a heat exchanger would result in the precipitation of salts and/or silica. In other cases, the amount of salts and/or silica in the source brine is so high that saturation temperature may be reached in a flash chamber when the brine is flashed, or somewhere in the heat exchanger during the heat exchange process with the organic fluid. In these cases, also, severe maintenance problems are presented.

As a consequence, many geothermal locations having hot brine in excess of 175° C., a temperature with which an organic fluid base power plant is economically feasible, cannot be used for power generation because of the salts and silica content of the brine.

Industrial processes, as well as combustion processes, are another source of hot fluids containing foreign material in the form of particulate that interfere with heat transfer. Examples of such fluids are hot gases containing particulates. In ferro-alloy plants, for instance, hot air exhausted from the plants entrain large quantities of particulate in the form of silica; and recovery from such air of heat which could be utilized for heating or producing steam, electricity, etc. is practical only if the foreign material, i.e., silica entrained in the air, can be treated in a manner that permits ongoing use of the heat. In the prior art, it has been found that, when heat exchangers are used with hot air containing particulate, the latter deposit on the heat transfer surfaces in contact with the gases causing fouling of the heat exchangers. This requires cleaning operations to be carried out regularly. Furthermore, because of the fouling problem, the heat exchangers must be constructed of expensive alloys which adds to the overall expense of the equipment and its maintenance.

Combustion processes used in power production, for example, are a source of hot fluids containing foreign material in the form of precipitates that interfere with heat transfer. The hot fluids can be produced by scrubbing flue gases produced by burning fuel, particularly high-sulfur content coal or oil often used to generate electricity. As is well known, it is conventional to scrub flue-gases in order to remove noxious gases before the flue gases are released to the atmosphere. Conventionally, flue gases, which often contain particulates as well as noxious gases, are scrubbed to remove sulfur dioxide by contacting the gases with a solution containing oxides or hydroxides of calcium or magnesium such that calcium or magnesium sulfate precipitates into the scrubbing solution. The result of this operation is the production of large quantities of hot liquid containing precipitates. The heat in this liquid is difficult to utilize because of the presence of precipitates.

It is therefore an object of the present invention to provide a new and improved method of and means for extracting heat from hot fluids containing foreign material such as salts and/or silica.

BRIEF DESCRIPTION OF THE INVENTION

According to the present invention, heat is extracted from a hot fluid, for example, a hot liquid containing scaling material whose solubility is proportional to the temperature of the liquid, and usually some vapor, which may be steam. The invention involves providing a pond containing a liquid, and positioning in the pond a vertical primary tube having an upper end that is substantially closed, and an open lower end immersed in the liquid in the pond and spaced from the bottom of the pond, for establishing a trapped region above a column of liquid in the tube. The hot fluid is supplied, preferably, to the trapped region; and the pond and the tube are constructed and arranged so that the liquid in the pond and the liquid in the column are in substantial hydrostatic equilibrium, and the pressure in the trapped region is maintained at a level such that the trapped region operates as a flash chamber wherein some of the liquid supplied to said trapped region flashes into a vapor which may be utilized downstream. As a consequence of the flashing in the trapped region of the tube, the liquid remaining in the tube becomes concentrated; and any scaling material that precipitates can thus fall, by gravity, through the lower open end of the primary tube to the bottom of the pond without disturbing the heat exchange process. Heat may be extracted from the vapor flashed in the trapped region to produce power. If precipitation occurs in the liquid external to the tube, the precipitates also fall by gravity to the bottom of the pond.

Where the fluid supplied to the primary tube includes hot water, a hot water solution, or hot geothermal brine, the vapor produced is steam which can be used to produce fresh water, or power, or a combination thereof.

Precipitates that accumulate on the bottom of the pond beneath the tube may be removed, for example, by dredging. Alternatively, if the precipitates reach a threshold height, the tube may be physically moved to another location. Preferably, cooling of the pond, mainly by evaporation, is inhibited. For this purpose, the surface of the pond may be covered by a thin plastic film.

To maintain the level of the pond as flashing occurs and more hot fluid is added to the tube, liquid from the pond may be withdrawn. The withdrawn liquid may be reinjected into the ground, in the case of water, water solution, or geothermal brine in a a conventional manner, preferably using an auxiliary settling pond where further cooling takes place causing additional precipitation of silica material which sinks to the bottom of the settling pond. In this case, the cooled liquid in the settling pond may then be reinjected into the ground.

Preferably, the ponds are operated under well-mixed conditions such that nucleation of precipitates will ensure that less than, or close to, saturation conditions are maintained in the liquid in the ponds, and oversaturation conditions are substantially avoided. In this manner, the liquid is rendered suitable for further extraction of heat, or for reinjection into the ground.

Optionally, the reinjection process may be carried out only during the day when the brine in the settling pond is at a relatively high temperature thereby ensuring a high level of solubility of the scaling material and its return to the ground. Alternatively, heat may be exchanged between the brine from the primary pond, before the brine enters the settling pond, with brine being delivered to the reinjection well for the purpose of raising the temperature of the brine to be disposed of and thereby increasing the solubility of the scaling material in the liquid being reinjected.

Precipitation, such as rain, may be available to dilute the liquid containing the scaling material to facilitate reinjection of the liquid into the ground. Alternatively, or in addition, heat extracted from heat depleted steam, or from condensate, available from a process that uses steam produced from geothermal brine, or from other water based solutions for producing electricity, and/or fresh water, heat depleted steam, or condensate, can be made available for heating and/or diluting the liquid containing the scaling material to facilitate reinjection.

In an alternative arrangement, a supplemental vertical tube may be located in the primary pond, this tube also having a substantially closed upper end that preferably projects above the surface of the pond, and an open lower end immersed in the pond and spaced from the bottom thereof, for establishing in the supplemental tube, a supplemental trapped region above a column of liquid in the supplemental tube. In this construction and arrangement of the tube relative to the pond, the liquid in the pond and the column of liquid in the tube are in substantial hydrostatic equilibrium; and the supplemental trapped region of the supplemental tube may be held under a vacuum such that the trapped region functions as a flash chamber causing some of the liquid in the column below the trapped region to flash into a vapor which may be utilized downstream. Where the fluid supplied to the primary tube comprises hot water, a hot water solution, or hot geothermal brine and some vapor, mostly steam, the vapor produced in the trapped region of the supplemental tube, is steam which can be used to produce fresh water, or power, or a combination thereof.

The liquid remaining in the supplemental tube during the flashing operation becomes more concentrated as a result of the flashing operation. Coupled with a reduced temperature and increased concentration of scaling material, the latter may precipitate in the tube; consequently, the precipitated scaling material can sink by gravity through the lower open end of the supplemental tube to the bottom of the pond. If precipitation occurs in the liquid external to the supplemental tube, the precipitates also falls by gravity to the bottom of the pond.

The supplemental tube may be provided with a plurality of circumferential openings near its lower end. Alternatively, or in addition, the supplemental tube may be provided with a concentrically positioned inner tube for the purpose of ensuring entry of relatively hot liquid from the upper portion of the pond, as well as an exit for the cooler and denser liquid that results from the flashing operation.

In a further embodiment, the supplemental tube may be positioned within the primary tube. In such case, a relatively high temperature will be ensured for the liquid entering the supplemental tube.

In both of the last mentioned arrangements, the level of liquid in the supplemental tube will be higher than the level of liquid in the primary tube because the temperature of liquid entering the supplemental tube will be less than that of liquid entering the primary tube. Finally, further supplemental tubes may be used.

The invention is also applicable to extracting heat from hot gases, for example, hot air containing entrained particulates such as silica, or hot flue gases containing entrained particulates, and/or noxious chemical compounds such as sulfur dioxide. The hot air or gases are contacted with a liquid, preferably in a pool or pond thereby cooling the air or gases and heating the liquid. Where entrained particulates are involved, the particulates are trapped in the liquid. Where noxious chemicals are involved, a chemical reaction occurring in the liquid causes precipitates to form.

The hot air or gases may be introduced into a liquid in a pond, preferably at a lower level, or contact may be made between the air or the gases and the liquid by spraying the liquid into the hot air or gas stream. The liquid may be water, a water solution, e.g., sea or lake water, industrial, domestic, or agricultural liquids, as well as surplus surface water, etc., or a liquid hydrocarbon. If the liquid used is water, or a water solution, heat may be extracted therefrom using a tube operating as a flash chamber (i.e., as the supplemental tube described above). In such case, steam will be produced and can be used to produce electricity and/or fresh water.

If the liquid used is a hydrocarbon, a heat exchanger located external to the pond, or optionally in the pond, can be used for exchanging heat in the heated liquid with a liquid or heat transfer fluid, for example, by vaporizing it. Vapor so produced can be expanded in a turbogenerator for generating power, or can be used for other purposes.

The particulates or precipitates present in the liquid eventually settle to the bottom of the pond and can be removed as needed. The last described embodiments are particularly useful in extracting heat from flue or waste gases in a manner that is environmentally safe.

BRIEF DESCRIPTION OF THE DRAWINGS

Embodiments of the present invention are described below by way of example with reference to the accompanying drawings wherein.

DETAILED DESCRIPTION

Figure 1:
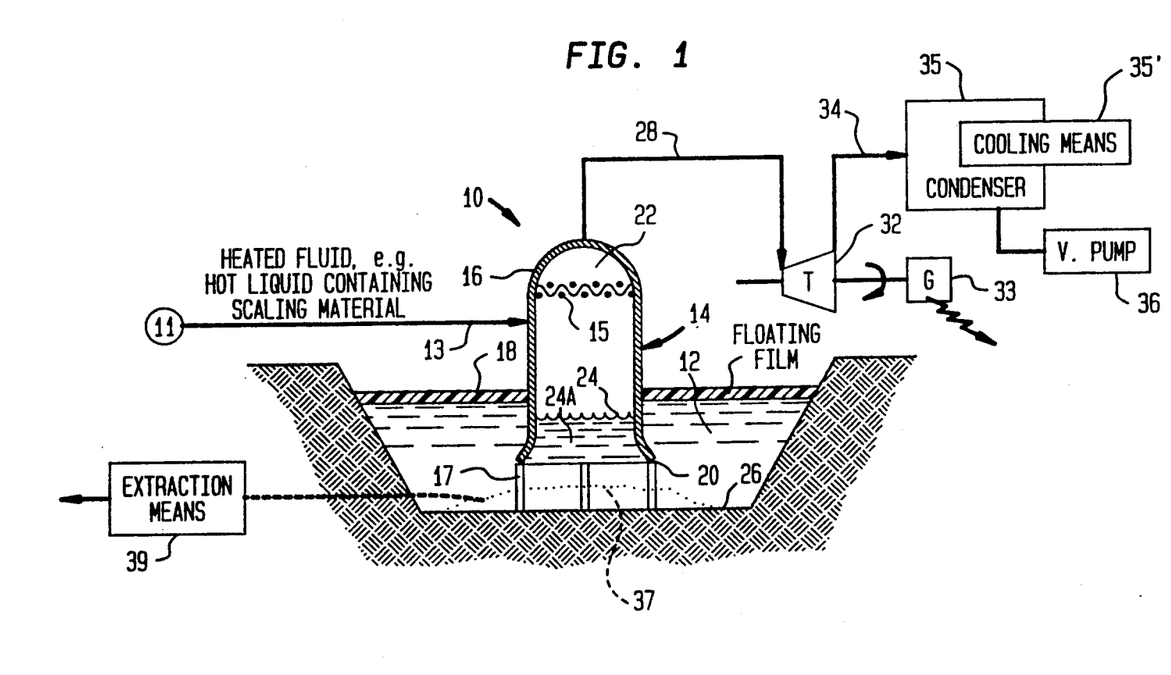
FIG. 1 is a schematic sectional view of one embodiment of the present invention.

Referring now to the drawings, reference numeral 10 in FIG. 1 designates apparatus according to one embodiment of the present invention for extracting heat from a hot fluid containing foreign material that interferes with heat transfer. In the embodiments described with reference to FIGS. 1, 2, 2A, 2B, 2C, 3, and 3A, heat is extracted from a hot fluid, which may comprise a hot liquid containing scaling material whose solubility is proportional to the temperature of the liquid, and some vapor, usually steam. Typically, the hot fluid may be derived from a geothermal source; and in such case, the liquid would be a brine which may contain saturated or nearly saturated solutions of scaling material in the form of silica, carbonates, salts, etc. The hot fluid may comprise water, or a water solution that is heated by contact with hot gas containing entrained particulate, such as hot air containing silica produced by an industrial process. Finally, the hot fluid may comprise a chemical solution that results from contacting hot flue gases containing noxious constituents with solutions that react with the constituents to form precipitates. In each case, heat in the fluid is recovered in a way that is independent of the foreign material in the liquid which would interfere with the conventional transfer of heat. For convenience, the description that follows refers to recovering heat from hot liquid brine containing scaling material even though some vapor, usually in the form of steam, is normally present with the hot brine.

Apparatus 10 includes primary pond 12 containing liquid preferably derived from source 11, and primary vertical flash tube 14 supported on the bottom of the pond by suitable support means, shown schematically by reference numeral 17. Tube 14 has upper end 16 which is substantially closed and which may project above surface 18 of the primary pond, and open lower end 20 immersed in the pond below surface 18, and spaced from the bottom of the pond. As a consequence of this position of the tube, trapped region 22 is established above a column of liquid 24A in the tube connecting to the liquid in pond 12.

Hot geothermal brine containing scaling material, is supplied to tube 14 by pipe 13. Preferably, the hot liquid is applied to trapped region 22 which is maintained at a pressure (below the pressure in pipe 13, as described below) such that the trapped region operates as a flash chamber wherein some of the hot brine supplied to the tube by pipe 13 flashes into steam. The remainder of the brine supplied to the tube is concentrated, and its temperature decreases which may cause scaling material therein to precipitate. If precipitates occur, the design effects sinking of the precipitates, by gravity, through lower open end 20 of the tube to bottom 26 of the pond because tube 14 is open at the bottom. In addition, since tube 14 is suspended in pond 12, space is provided between the open end 20 of the tube and the bottom of the pond for effecting the egress of precipitates to the bottom. If precipitation occurs in liquid external to tube 14, the precipitates also fall by gravity to the bottom of the pond.

As discussed below, the pressure required to sustain flashing in trapped region 22 is maintained, substantially, by by downstream utilization device 30, and is likely to be above atmospheric pressure, but below the pressure of the brine in pipe 13. As a consequence, surface 24 of column 24A will be below the level of surface 18 of the pond which is at atmospheric pressure. The reduction in pressure experienced by the hot brine entering trapped region 22 serves to flash water in the brine to steam. For example, if the brine source temperature were 120° C., the brine source pressure would be about 2 bar; and the pressure in trapped region 22 would be maintained at about 1.3 bar. Also as discussed below, the pond size, its depth, the tube diameter, and other physical parameters of the apparatus are selected such that the liquid in the pond, and the liquid in column 24A are in substantial hydrostatic equilibrium.

The hot vapor produced in flash chamber 22 above surface 24 of the fluid in tube 14 can be piped via line 28 to utilization device 30. Preferably, utilization device 30 comprises vapor turbine 32 coupled to generator 33 such that vapor in line 28 expands in turbine 32 producing heat depleted vapor in exhaust 34. The energy extracted from the vapor in turbine 32 drives generator 33 which produces electricity.

Figure 3:
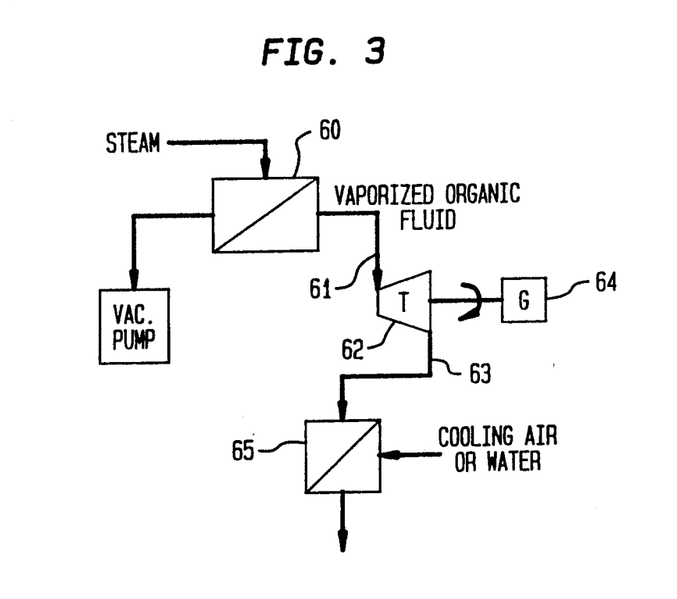
FIG. 3 is a schematic block diagram of a portion of a plant that maybe utilized in connection with the various embodiments of the present invention.

Heat depleted vapor exhausted from turbine 32 is supplied to condenser 35, cooled by suitable cooling means, wherein condensation takes place. The cooling means for condenser 35 maintains the required pressure difference across utilization device 30, comprising, in the example, turbine 32 (i.e., the required pressure difference between trapped region 22 in tube 14 and condenser 35) for sustaining flashing and consequent vapor flow. Means 38, shown as a vacuum pump associated with condenser 35 serves to extract non-condensable gases from the condenser to prevent a buildup of such gases in the condenser which would adversely affect the heat transmission characteristics of the condenser.

Where the hot liquid applied to tube 14 is geothermal brine, hot water, or a hot water-based chemical solution, utilization device 30 will include a steam turbine, and heat depleted saturated steam exhausted by the turbine may flow directly to atmosphere, or may be utilized in combination with an air or water cooled condenser. Alternatively, the steam produced can be used to vaporize an organic fluid for use in producing electricity as shown in FIG. 3. When the steam is exhausted to the atmosphere, then pressure in flash chamber 22 is inherently determined by the dimensions of the turbine, piping, etc. of the system, and thus will be limited. On the other hand, however, when a condenser is used, the effectiveness of the turbine is higher due to the temperature and pressure differences between flash chamber 22 and condenser 35.

Figure 3A:
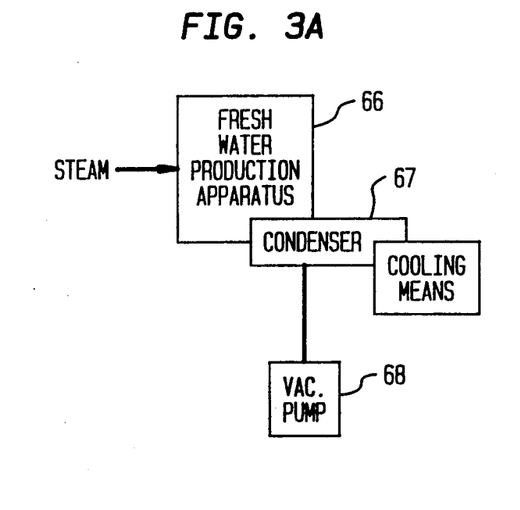
FIG. 3A is a schematic block diagram of another portion of a plant that maybe utilized in connection with the various embodiments of the present invention.

In another alternative, the utilization device can be apparatus designated by reference numeral 66 in FIG. 3A for producing fresh water using steam produced by tube 14. Such apparatus includes condenser 67 cooled by suitable means, such as water. The operation of the condenser serves to maintain the required pressure difference across the utilization device, i.e., between trapped region 22 of tube 14, and condenser 67, and enables the trapped region to be maintained at a pressure that causes the trapped region to act as a flash chamber. Means 68, shown as vacuum pump 68, preferably connected to condenser 67, extracts noncondensable gases from the condenser. In a still further alternative, utilization device 30 can be apparatus for producing electricity as well as fresh water using the steam. A number of such alternatives are disclosed in application Ser. No. 443,683, the subject matter of which is incorporated by reference.

To prevent undue precipitation of the scaling material in the pond due to its cooling, pond 12 may be covered. Preferably, a plastic film cover indicated by reference numeral 36 may be applied to the surface pond. The film cover will float on the surface of the pond and restrict the lost of heat by evaporation of the fluid from pond 12.

Precipitates accumulate beneath tube 14, indicated schematically by reference numeral 37 in FIG. 1, and may be removed from the pond by extraction means 39, e.g., a dredger. Alternatively, if the height of the precipitates reaches a threshold, tube 14 may be physically moved from its location directly above the mound of precipitates to another location. In this manner, scaling material which may precipitate during the flashing operation will not block the flash chamber thereby permitting heat to be extracted from a hot liquid which contains scaling material up its saturation level.

While a pond is shown and described above as the container for the liquid within which tube 14 is mounted, it should be understood that the tube could also be mounted in a structure such as a tank. Thus the term pond is used herein to mean an excavation containing a liquid as well as a structure above ground for containing a liquid.

Where the pressure of the hot liquid contain scaling material is sufficiently high, e.g., exceeding about 2 atmospheres, it is possible to first utilize the hot liquid in some other heat or energy extracting device before applying the liquid to the present invention if the amount of scaling material permits such operation. This will result in keeping construction cost at a reasonable level in order to avoid large structures for housing tube 14. For example, a pond containing about 3000 cubic meters of liquid where the hot liquid would have a pressure less than two atmospheres, would require a tube of a minimum length of about 10 m. in length below the surface of the pond. Where the liquid is geothermal fluid, the flashing of this fluid into steam would permit production of approximately 1 MW of power in the configuration shown in FIG. 1 when the diameter of tune 14 is about 3 m. However, in such a situation, the means used to maintain the pressure difference across the utilization device can be designed and operated so that the pressure in trapped region 22 is such that the level of the surface of the liquid column in tube 14 is maintained at a level which would require only a relatively small length of tube to be present below the pond surface while still maintaining hydrostatic equilibrium between the liquid in the column of liquid in tube 14 and the liquid in the pond.

Figure 2:
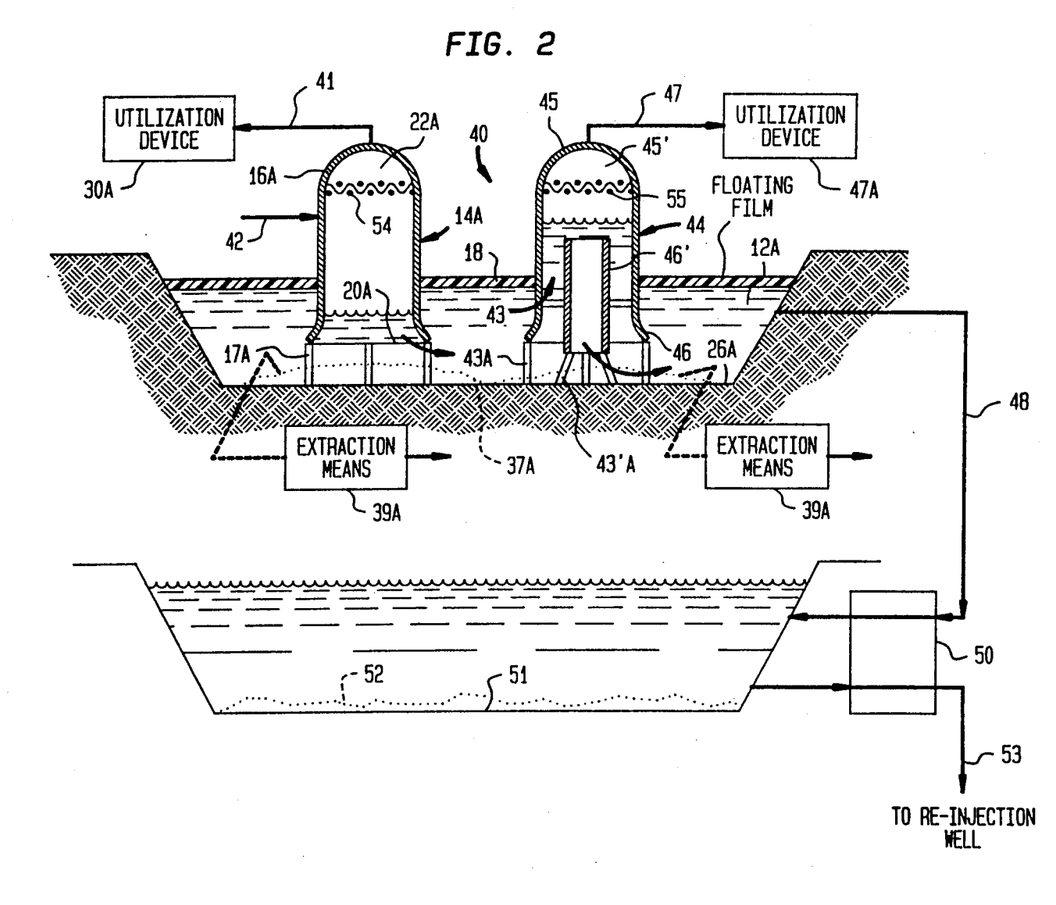
FIG. 2 is a schematic sectional view of a second embodiment of the present invention.

In a steady state flow situation wherein hot liquid containing scaling material is continually supplied to tube 14, the difference between the input flow and the flow of vapor or steam exiting tube 14 will normally result in a an increase in the level of the pond. In order to maintain the level constant in the face of the continuous operation, the arrangement shown in FIG. 2 may be utilized. That is to say, liquid from pond 12 can be disposed of directly to a reinjection well. Chemicals may be added to the liquid in order to facilitate reinjection. Preferably, the outflow from the primary pond can be directed to a settling pond as indicated in FIG. 2. Such case, the hot liquid would ultimately cool causing precipitation of the scaling material to the bottom of the settling pond. The liquid in the settling pond can then be conveyed to a reinjection well if preferred. As indicated in FIG. 2, it is preferable to heat the liquid being disposed of in the reinjection well for the purpose of ensuring that scaling material remains in solution. To this end, a counterflow heat exchanger may be utilized wherein heat from the liquid flowing into the settling pond is used to heat the liquid flowing to the reinjection well.

Figure 2A:
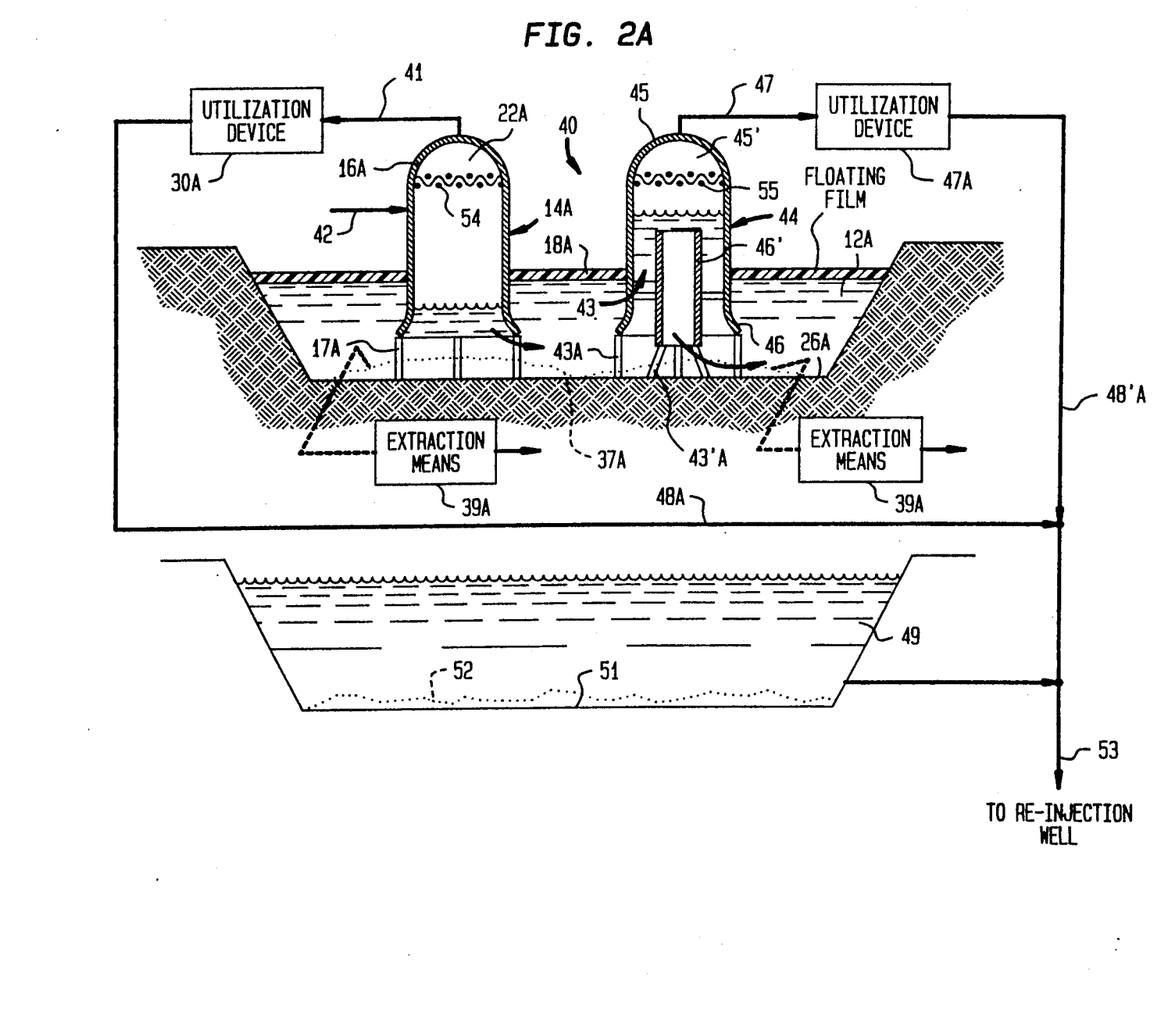
FIG. 2A is a schematic sectional view of another embodiment of the present invention.

Alternatively, heat from depleted steam, or condensate, heat depleted steam itself, or condensate exiting utilization device 30A and/or 47' can be made available for heating and/or diluting the liquid containing the scaling material to facilitate reinjection. For this purpose, piping 48A and/or 48'A can be used to add heat from heat depleted steam or condensate exiting utilization device 30A and/or 47' to liquid exiting settling pond 49 for reinjection into a reinjection well via piping 53 as shown in FIG. 2A. In this manner, such steam or condensate not only heats the liquid prior to its reinjection to reduce the possibility of precipitation, but also can be used to dilute the liquid further reducing the possibility of precipitation. In addition, by adding steam or condensate to the liquid being reinjected, the water level in the geothermal source can be maintained.

Chemicals can be added to the liquid to facilitate reinjection.

In what is presently considered to be the preferred embodiment or best mode of the present invention, the arrangement of flash evaporators shown in FIG. 2 can be utilized. In apparatus 40 shown in FIG. 2, a second or supplemental vertically oriented tube is utilized. Like the primary tube, the supplemental tube is supported by suitable structure, e.g., support means 43A, from the bottom of the pond, and has an upper end which is substantially closed, and which may project above the surface of the pond, and an open lower end immersed in the pond below its surface and spaced from the bottom of the pond. That is to say, apparatus 40 includes pond 12A containing liquid having scaling material, and primary vertical tube 14A having closed upper end 16A projecting above surface 18A of the pond.

Pipe 42 is provided for supplying hot fluid, comprising hot liquid containing scaling material, preferably to trapped region 22'A of the upper portion of tube 14A which operate in substantially the same way that tube 14 in FIG. 1 operates. The substantially closed upper end of the tube is maintained at a pressure such that it operates as a flash chamber wherein liquid supplied to trapped region of tube 14A via pipe 42 is flashed into vapor and can be transmitted via piping 41 to utilization device 30A which may take the form of power generating means shown in FIG. 1, fresh water production apparatus in FIG. 3A, or a combination of both.

As in the case of the embodiment shown in FIG. 1, the concentration of scaling material in the liquid column in tube 14A is increased as flashing occurs and can be accompanied by precipitation of the scaling material. Such precipitate material, if formed, is free to sink through the lower open end of tube 14A to bottom 26A of the pond. If precipitation occurs in liquid external to tube 14A, the precipitates also fall by gravity to the bottom of the pond. In addition, since tube 14A is suspended in pond 12A, space is provided between open end 20A of the tube and the bottom of the pond for effecting exit of precipitates to the bottom. In this respect, the embodiment shown in FIG. 40 operates substantially the same way as the embodiment shown in FIG. 1.

Laterally spaced from primary flash tube 14A is supplemental vertically oriented flash tube 44 whose upper end 45 is substantially closed and projects above surface 18A of pond 12A, and whose open lower end 46 is submerged below surface 18A. Second tube 44 is preferably provided with a plurality of apertures 43 circumferentially spaced around the lower portion of the tube for permitting liquid in the upper portion of pond 12A to flow into tube 44. The upper portion of this tube is evacuated and forms trapped region 45' which serves as a flash chamber for receiving vapor from the column of liquid in tube 44. The vapor so produced can be directed by piping 47 to a utilization device which may take the form of a power generating means, and/or fresh water production apparatus analogous to those designated by numerals 30 and 66 in FIGS. 1 and 3A respectively. Also here, the pressure in trapped region 45' required for flashing is maintained substantially by utilization device 47A as described above.

When electricity is produced by a steam turbine and a condenser is provided for condensing steam exhausted from the turbine, the pressure difference between trapped region 22A in the flash tube and the condenser, which is the pressure differential across the turbine, is maintained by the extent of the heat extracted from the condenser such that flashing in region 45'' and consequent vapor flow is sustained. In such case, non-condensable gases in the condenser may be extracted from the condenser by a vacuum pump as previously described. Also, when fresh water is produced, cooling means for the condenser, and a vacuum pump connected to the condenser as shown in FIG. 3A can be used for the same purpose.

As in the case of tube 14A, precipitate which may be formed by the flashing operation carried out in tube 44 is permitted to fall by gravity through the open lower end 46 of tube 44 to bottom 26A because tube 44 is open at the bottom. In addition, since tube 44 is suspended in pond 12A, open bottom end 46 of the tube is spaced from the bottom of the pond for effecting the exit of precipitates to the bottom. The heavier liquid produced by reason of the flash evaporation process carried out inside tube 44 flows downwardly through the open lower end of the tube into pond 12A. Also here, if precipitation occurs in the liquid external to tube 44, the precipitates fall by gravity top the bottom of the pond.

Apertures 43 effect the entrance of liquid from the upper portion of pond 12A into tube 44. Liquid entering tube 44 through the apertures will be hotter than the liquid at the lower end of tube 44 because the hotter liquid is lighter and more buoyant than the cooler and more dense liquid exiting tube 44 after flashing occurs. Consequently, hotter liquid will flow through the apertures into the outer portion of tube 44 in the vicinity of its wall, and cooler and denser liquid will flow downwardly through the central portion of tube 44. Preferably, as shown in FIG. 2, tube 44 is provided with inner tube 46' concentrically located in tube 44 by suitable means, e.g., support means 43'A in order to ensure such a flow pattern. As shown, the lower open end of inner tube 46' is spaced from the bottom of the pond.

Figure 2B:
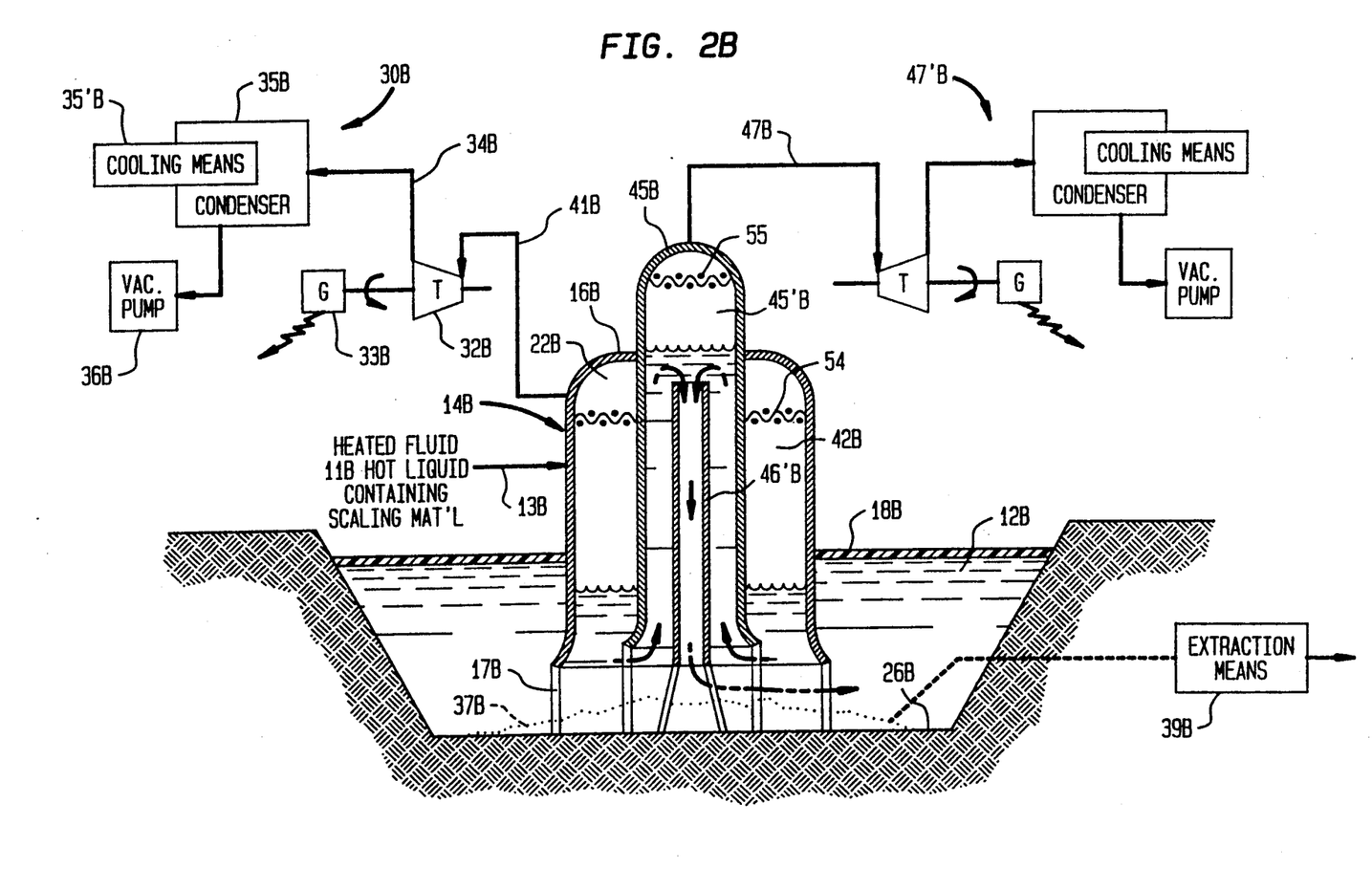
FIG. 2B is a schematic sectional view of another embodiment of the present invention.
Figure 2C:
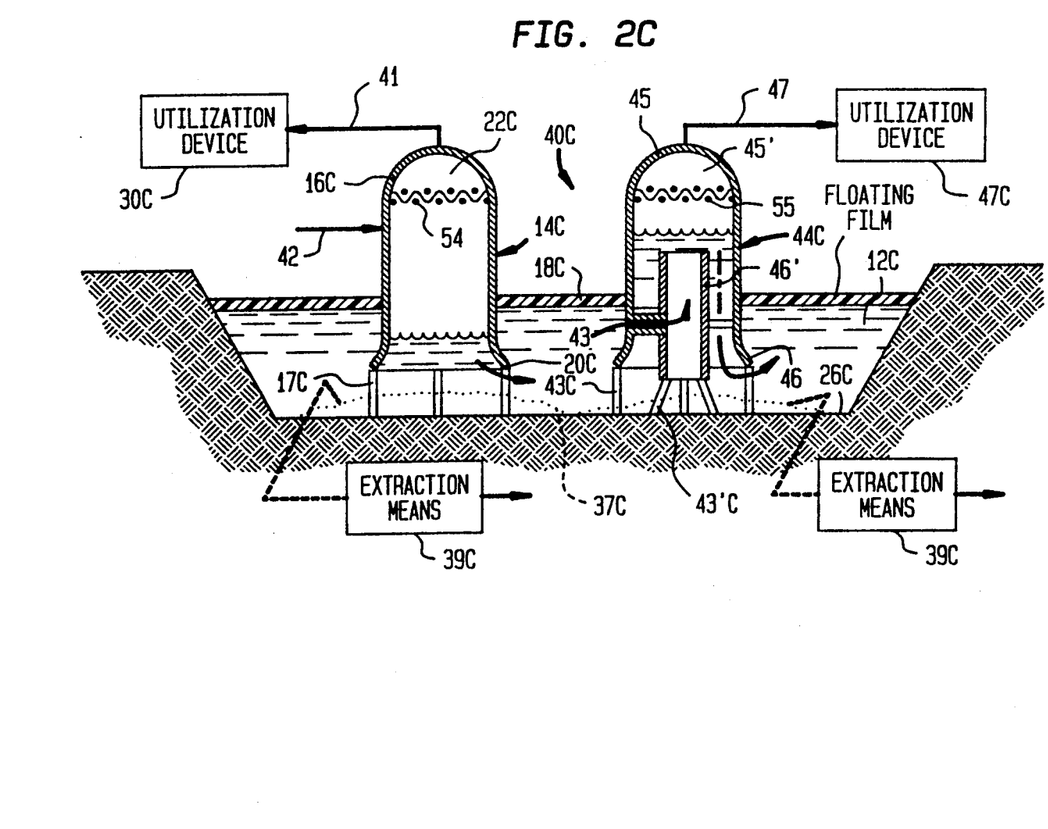
FIG. 2C is a schematic sectional view of still another embodiment of the present invention.

Alternatively, the inflowing warmer liquid can be directed to the inner tube with the cooler and denser liquid exiting tube 44C flowing down towards the pond floor v ia the outer portion of tube 44C shown in FIG. 2C. Such arrangements are analogous to the flash evaporator included in power plant disclosed in application Ser. No. 443,683, the subject matter of which is hereby incorporated by reference.

Liquid in pond 12A, 12B, 12C as well as in pond 12, shown in FIG. 1, is in substantial hydrostatic equilibrium with the liquid present in the column of water present in tubes 14A and 44, 14B and 44B, 14C and 44C, as well as in tube 14 shown in FIG. 1. Such hydrostatic equilibrium is achieved in the present invention by choosing the dimensions of the flash tubes (e.g., the opening at the lower end of tubes 14, FIG. 1; 14A, 44, 46', FIG. 2 and 2A; 14B, 44B, 46'B, FIG. 2B; and 14C, 44C and 46'C FIG. 2C) and ponds 12, 12A, 12B and 12C such that energy E of the liquid in the pond is virtually constant throughout the pond and substantially equal to the energy of the liquid in the liquid column in the flash tubes. Energy, E, is defined by the Bernoulli equation as follows:

$$E = gz + P/\rho + v^2/2 \tag{1}$$

where
    g is the acceleration due to gravity;
    z is the height of the liquid above a reference level;
    P is the pressure of the liquid;
    $\rho$ is the density of the liquid; and
    v is the velocity of the liquid.

In the present invention, the dimensions of the flash tubes and inner tubes are selected such that the velocity of the liquid is small such that it can be neglected from the above equation. Thus, the liquid at the interface with the trapped region of a tube effectively acts as a fixed wall whose actual elevation in the pond is dependent of the various parameters of the system.

Because the pressure at the liquid surface in the pond is atmospheric in pressure, the level of the liquid surface of the column of liquid in the tubes will be determined by the vapor pressure in the flash chamber or trapped region above the liquid column in the upper portion of the tubes. This in turn is connected to the temperature of liquid flashing in the trapped region.

Since the temperature of the liquid being applied to primary tube 14 (in FIG. 1), and to primary tube 14A (in FIG. 2) typically will be above 100° C., the pressure in the trapped region above the liquid column present in tubes 14 and 14A will usually be greater than atmospheric pressure, with the result that the level of the surface of the liquid column will be below the level of the surface of the pond. On the other hand, since the temperature of the liquid flashing from the surface of the liquid column in supplemental tube 44 will be lower than that of the liquid flashing in column 24A of primary tube 14A, and normally below 100° C., the level of the surface of the liquid column in supplemental tube 44 will usually be above that of the surface of the pond, and also above the liquid level of the column in tube 14A. If, however, the temperature of the liquid applied to tube 14 or 14A is less than about 100° C., the level of the surface of the liquid in the tube will be above the surface of the liquid in the pond.

In another embodiment of the present invention, shown in FIG. 2B, two tubes designated 14B and 44B are also used. Here, the tubes are located in the pond and supported by suitable means, e.g., by support means 17B, 43B, and 43'B when inner tube 46'B is used. As a result, the lower open ends of the tubes are are immersed in the liquid in the pond, and spaced from the bottom to provide clearance for any precipitates that form during the operation of the apparatus.

In this embodiment, however, supplemental tube 44B is concentric with and partly contained within primary tube 14B. The operation of this embodiment is basically similar to that described above and shown in FIGS. 2 and 2A in that trapped regions or chambers 22B and 45'B operate as flash chambers for producing vapor from fluid supplied through conduit 42B and liquid present at the surface of the liquid column present in tube 44B. Cooled liquid exits tube 14B and enters tube 44B preferably through an annulus between tube 44B and inner tube 46'B. This liquid flows upwardly to the surface of the liquid column in tube 44B where vapors are produced, with the consequently cooler and heavier liquid exiting tube 44B via inner tube 46'B, when used, which extends into liquid in pond 12B preferably to a level lower than lower end 20B of tube 14B. Lower end 20B of tube 14B preferably extends into the liquid in pond 12B to a level lower than lower end 46B of tube 44B.

Vapor, usually steam, produced by chambers 22B and 45'B can be directed by piping 41B and 47B to utilization devices 30B and 47'B respectively shown as vapor turbines for generating electricity. When the vapor produced is substantially steam, these turbines will comprise steam turbines and their operation will be similar to that described above in relation to FIG. 2.

Optionally, utilization devices 30B and 47'B may comprise apparatus for generating electricity as shown in FIG. 3, apparatus for producing fresh water as shown in FIG. 3B, or apparatus for producing both electricity and fresh water as described above with reference to FIG. 2.

By using the embodiment shown in FIG. 2B, heat losses particularly due to evaporation are minimized since substantially all of the liquid containing heat available for heat extraction flows virtually within the bounds of tube 14B. This reduces mixing between liquid containing heat available for extraction and cooler liquid present in the pond. Furthermore, the presence of inner tube 46'B reduces mixing between warm liquid entering and cooler liquid exiting tube 44B. Such an arrangement enhances heat extraction while ensuring that precipitation, if it occurs, will take place in the cooler fluid exiting tube 44B via inner tube 46'B. By extending inner tube 46'B below the lower end 20B of tube 14B, such mixing can be decreased even further. In this embodiment, a floating film cover and a separate settling pond can be eliminated if preferred because in this embodiment, substantially all of the heat is contained within flash tube 14B allowing the balance of pond 12B to function as a settling pond.

Use of two flash tube tubes also permits higher levels of efficiency to be achieved than when merely one flash tube is used to produce electricity. For example, if fluid having a temperature of about 120° C. and pressure of about 2 bar, is supplied to the primary flash tube for the production of electricity, a pressure of approximately 1.3 bar will be maintained in the flash chamber, while steam at about 85° C. will be produced in the supplemental flash tube by maintaining a pressure of approximately 0.6 bar in the second flash chamber.

In an example that would generate 1 MW of power, the primary tube would have a diameter of about 3 m. and a like submergence. The supplemental tube would have a diameter of about 3 m. and liquid would extend about 4 m. above the surface of the pond which would have a depth of about 5 m. and an area of about 1,000 m². These dimensions would establish the required hydrostatic equilibrium. The inflow rate of brine would be about 300 m³/hr. at a temperature of about 120° C.

Liquid in pond 12A shown in FIG. 2 (and pond 12B, if used) can be drawn via piping 48 into settling pond 49. As indicated in FIG. 2, heat exchanger 50 may be provided for the purpose of extracting heat from the liquid flowing from pond 12A to settling pond 49. The cooled liquid will effect the precipitation of scaling material which falls by gravity to bottom 51 of settling pond 49 as indicated at 52. After a considerable amount of the scaling material has precipitated in settling pond 49, the liquid therein can then be passed through heat exchanger 50 via piping 53 and transferred to a reinjection well for reinjection into the ground. Heating the liquid that is conveyed to the reinjection well will prevent precipitation in the piping and pumps associated with the well, and also in the well itself.

Alternatively, as shown in FIG. 2A, heat depleted water vapor or condensate exiting utilization device 30A and/or 47' via lines 48A and 48'A can be used for heating and/or diluting liquid conveyed to the reinjection well for preventing precipitation in the piping and pumps associated with the well, and also in the well itself if the liquid is reinjected. Furthermore, precipitation such as rain can be used fore diluting liquid in the settling pond.

Operation of the embodiment shown in FIG. 2 can be facilitated when the reinjection process is carried out only during the day rather than continuously, day and night. During the day, solar radiation incident on settling pond 49 serves to heat the liquid in the settling pond thus increasing the solubility of the scaling material. In such case, pond 49 should be a shallow pond for enhancing heating of the liquid therein. As a consequence, heat exchanger 50, or use of steam, or condensate (as shown in FIG. 2A) to heat the liquid to be reinjected, can be eliminated, if preferred, and the warmed hot liquid containing the scaling material can be sent directly to a reinjection well.

At night, when long wave radiation from pond 49 serves to cool the liquid therein, precipitation of the scaling material will occur. Therefore, the pumping operation by which the liquid is reinjected into the ground is carried on only during the day to ensure a high amount of scaling material will be removed from the settling pond. Chemicals can be added to the liquid to facilitate reinjection.

While the apparatus shown in the previously described embodiments is suitable for producing steam, particularly when the hot liquid is geothermal fluid, a dual fluid cycle can be utilized. In such case, the steam produced by flash tube 14, tubes 14A and 44, tubes 14B and 44B, and tubes 14C and 44C, as shown in the previous figures, instead of being piped directly to vapor turbines, would be directed to vaporizer 60 such as shown in FIG. 3. In the vaporizer, heat will be extracted from the steam and used to vaporize an organic fluid which would be supplied via piping 61 to organic fluid turbine 62 where the vaporized organic fluid expands producing heat depleted fluid in exhaust piping 63. The work extracted from the vaporized fluid by turbine 62 is supplied to generator 64 which generates electricity in a conventional manner. Cooling of the steam achieved by the organic fluid in vaporizer 60 maintains the pressure difference between the flash chamber on the steam side of vaporizer 60, while means such as vacuum pump 60', preferably connected to the steam side of vaporizer 60, is used for extracting non-condensable gases.

Heat depleted vapor exhausted from turbine 62 is applied to condenser 65 where cooling water or air condenses the heat depleted organic vapor into a liquid which is applied to vaporizer 60 so that the cycle repeats. Thus, a complete power plant may include a single or multiple flash chamber arrangement, such as shown in FIGS. 1, 2, 2A, 2B, or 2C, and a steam turbine driven by steam produced by the flash evaporation process, or an organic fluid turbine illustrated in FIG. 3.

The advantage of the arrangement shown in FIGS. 1, 2, 2A. 2B, and 2C deals with facilitating the precipitation of scaling material in the hot fluid as the latter is cooled during a heat exchange process that involves flashing liquid into a vapor. As indicated, the vertically disposed tubes which act as flash chambers for evaporating liquid are designed to effect the passage of precipitates in a manner that does not block the operation of the apparatus. Precipitates that collect on the floor of the pond beneath the open end of the flash chamber tube or tubes may be dredged from the bottom of the pond. Alternatively, the tube to tubes may be moved to a different physical location.

The present invention is also directed to a method and apparatus for utilizing heat contained in a stream of hot gas or hot flue gas containing entrained particulates and/or noxious gases. For example, the invention is applicable to recovering waste heat in hot air streams associated with the operation of ferro-alloy plants. In a plant of this type, air at an average temperature of about 350° C. and a flow rate of about 500,000 m$^3$/hr is involved. Entrained with this air may be as much as 6g/m$^3$ of silica whose presence has previously made the utilization of the heat contained in the air difficult by reason of the fouling of heat exchangers with the silica.

The invention is also applicable to recovering heat in flue gases that must be scrubbed of noxious gases, e.g., sulfur dioxide, before venting of the flue gases is permitted. Scrubbing is achieved by contacting the hot flue gases with a water solution containing oxides or hydroxides of calcium or magnesium, and effecting a reaction that results in the precipitation into the solution of calcium sulfate. The solution is heated by its contact with the gases, and the present invention is useful in recovering this heat. Advantageously, the heated solution can be utilized in the apparatus of the previously described embodiments, wherein preferably the heated solution is applied directly to flash tube 14 (FIG. 1), or primary flash tube or tubes as described in the other previously described embodiments.

Figure 4:
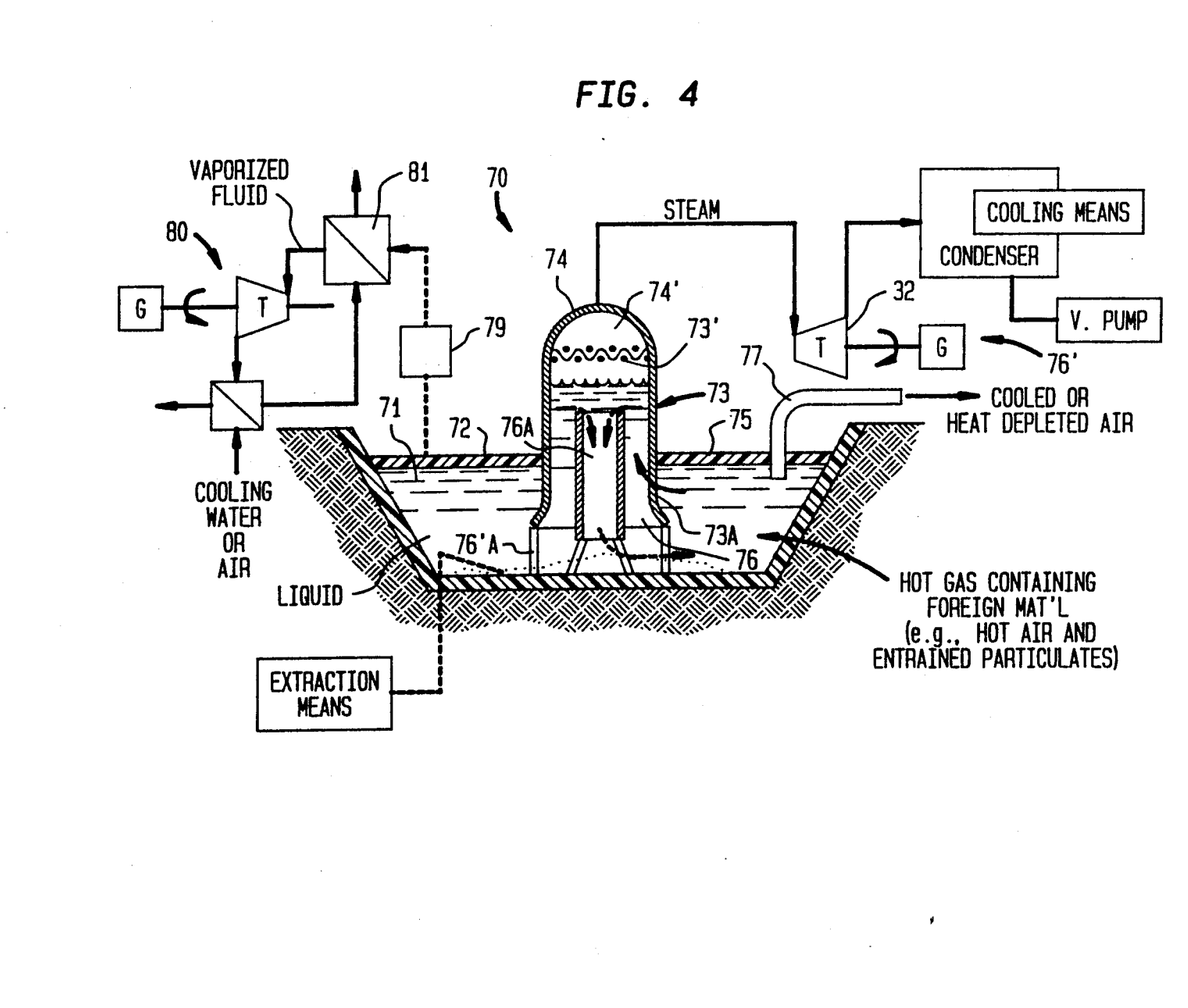
FIG. 4 is a schematic sectional block diagram of a further embodiment of the present invention.

In order to extract heat from hot gas containing particulates, e.g., hot air containing entrained silica, or flue gases containing particulates and/or noxious compounds such as sulfur dioxide, the embodiment illustrated in FIG. 4 can be utilized. Specifically, apparatus 70 shown in FIG. 4 includes a source of hot gas such as air in which particulates such as silica is entrained, and pond 71 containing a liquid. Preferably, the liquid is water, although a water solution, (e.g., sea or lake water, industrial, domestic, or agricultural liquids, as well as surface water, etc.). Furthermore, a hydrocarbon, such as oil, is an alternative possibility. For convenience, the description that follows refers to recovering heat from hot air containing entrained silica, but is relevant to recovering heat from hot gases containing particulates, such as flue gases.

The hot air and entrained silica interact with the water, or water solution when used, in the pond such that the air is cooled and exits the pond through cover 72 (such as a porous plastic film). Such an arrangement prevents substantial back pressure on incoming air flow. The water, or water solution, in the pond is thus heated to a temperature preferably close to but less than 100° C. as the entrained particulate settle to the bottom of the pond. The particulate on the bottom of the pond can be extracted by dredging, scraping, etc.

When water, or a water solution is used, vertically oriented flash 73 is located in the pond and supported therein by suitable means, e.g., support means 76'A. Upper end of flash tube 73 is substantially closed and may project above the surface 75 of the pond, and open lower end 76 of the tube is submerged below the surface and spaced from the bottom of the pond. A trapped region 74 is established as in the previously described embodiments with reference to the supplemental flash tube. Also, the tube and pond are constructed and arranged so that the liquid in the pond and the liquid column in tube 73 are in substantial hydrostatic equilibrium. Finally, tube 73 is preferably provided with plurality of apertures circumferentially spaced around the lower portion of the tube for effecting entry thereinto of warm liquid in the upper portion of pond 71.

Trapped region 74 at the upper end of tube 73 is evacuated such that it operates as a flash chamber wherein hot water in the tube flashes into steam which can be supplied to steam turbogenerator 76 which generates electricity. The steam exhausted from the turbogenerator may be vented to the atmosphere, or may be applied to an air or water cooled condenser. The cooling means for the condenser maintains the required pressure difference between the trapped region and the condenser for sustaining flashing and consequent vapor flow, while means such as a vacuum pump, connected preferably to the condenser, is used to extract non-condensable gases.

Alternatively, the steam can be supplied to apparatus for producing fresh water such as that designated by reference numeral 66 in FIG. 3A and described above. In a further alternative, the steam may be supplied to apparatus for producing both electricity and fresh water.

Preferably, tube 73 is provided with concentric, inner tube 76A and is positioned by suitable means, e.g., supporting means 76"A, such that its lower open end is spaced from the bottom of the pond. This ensures that the warm liquid entering tube 73 is directed to the upper portion of tube 73 and the cooler and more dense liquid exiting the tube flows downwardly toward the floor of the pool through the central portion of tube 73. Alternatively, the inflowing warmer liquid can be directed to the inner tube with the cooler and more dense liquid exiting tube 74 flowing downwardly towards the floor of the pool via outer portion of tube 74 similar to the flow described above in relation to FIG. 2C. These arrangements are analogous to the flash evaporator included in the power plant disclosed in application Ser. No. 443,683 referred to above.

If the hot gases contain entrained particulates and/or noxious gases such as sulfur dioxide present in, for example flue gases, the present embodiment can also be used if the liquid in pond 71 is a water solution for scrubbing the gases. If the gases contain sulfur dioxide, for example, water solution 71 may contain oxides or hydroxides of calcium or magnesium, to effect precipitation of calcium and magnesium sulfate. If precipitation occurs, the precipitates, together with particulates, settle to the bottom of the pond without interfering with the operation of the tubes.

Vertically oriented flash tube 73 will operate as previously described with reference to the present embodiment and previous embodiments in that steam produced from the solution present in tune 73 can be utilized for producing electricity and/or fresh water. If precipitates are formed in liquid present in tube 73 during the flashing of liquid or solution, lower end 76 of tube 73 effects the sinking of the precipitates to the bottom of the pond. The spacing of the bottom of this tube from the bottom of the pond effects the removal of precipitates from beneath the tube.

Alternatively, and particularly when the pond contains a hydrocarbon liquid, heat exchanger 81 may be provided for exchanging heat in the liquid in the pond with an organic fluid that is supplied to a close Rankine cycle power plant such as that indicated by reference numeral 80.

Preferably, the liquid hydrocarbon is treated by separating means 79 for separating silica present in the liquid supplied to heat exchanger 81. By using a hydrocarbon liquid, particularly oil, the temperature of the liquid in the pool can be higher than if water were used permitting a higher vaporization temperature to be achieved. Consequently, the thermal efficiency will be higher than if water were used. In addition, the heat remaining in the heat depleted air can be used to generate electricity using a further heat exchanger and closed Rankine cycle power plant like heat exchanger 81 and plant 80 shown in FIG. 4, or via a further water pool and flash chamber like those shown in FIG. 4. When a hydrocarbon liquid is used in pool 71, the temperature of the heat depleted air will be higher than that when water is used. Alternatively, the heat present in the heat depleted air can be used for producing fresh water using a further water pool and flash chamber like those shown in FIG. 4 connected to apparatus 66 (shown in FIG. 3B) or by using a further heat exchanger similar to heat exchanger 81 (supplied with water) and apparatus 66 (shown in FIG. 3B).

While a single flash tube is described above in connection with this embodiment, a plurality of flash tubes can also be used.

In these ways, heat in the hot air containing entrained particulates can be recovered.

While the embodiments of the present invention described above with reference to FIGS. 1, 2, 2A, 2B, 2C, 3, and 3A, refers to a fluid which usually comprises substantially a hot liquid containing scaling material whose solubility is proportional to temperature of the liquid, and some vapor, the vapor may also contain scaling material usually in the form of particulates. This is particularly true with geothermal fluids. In such case, the fluid can be applied directly to the pond for extracting the scaling material form the vapor using a flash tube or tubes as described in relation to FIG. 4 to produce preferably fresh water and/or electricity. Alternatively, apparatus such as demisters or separators 15 as shown in FIG. 1 can be used to separate particulates entrained in the vapor. Such a situation may also occur in the steam produced in the trapped regions in the manner previously described. Separator 15 shown in FIG. 1, and separators 54 and 55 shown in FIGS. 2, 2A, 2B, and 2C, and separator 73' shown in FIG. 4 can be used for separating entrained particulates from the vapors.

The advantages and improved results furnished by the method and apparatus of the present invention are apparent form the foregoing description of the preferred embodiment of the invention. Various changes and modifications may be made without departing from the spirit and scope of the invention as described in the appended claims.

What is claimed is:

1. Apparatus for extracting heat from a hot liquid comprising hot water containing scaling material whose solubility is proportional to the temperature of the liquid, said apparatus comprising:
   a) a primary pond containing water;
   b) a vertical tube located in the pond and having an upper end that is substantially closed, and an open lower end immersed in the water in the pond and spaced from the bottom thereof for establishing a trapped region above a column of liquid in said primary tube;
   c) means for supplying said hot liquid to said trapped region;
   d) said pond and said tube being constructed and arranged so that the water in the pond and the liquid in said column are in substantial hydrostatic equilibrium;
   e) means for maintaining said trapped region at a pressure such that some of the water in the hot liquid supplied to said trapped region flashes into steam thereby concentrating the liquid in the column of liquid, the open lower end of the vertical tube effecting the passage to the bottom of the pond of scaling material that precipitates as a consequence of the concentration of liquid below the trapped region;

f) means for extracting heat from said steam; and g) means for producing electricity including a vaporizer for vaporizing an organic fluid with heat extracted from said steam, a turbogenerator for extracting work from the vaporized organic fluid and producing electricity and heat depleted organic fluid, an organic fluid condenser for condensing the heat depleted organic fluid vapor and producing liquid organic fluid condensate, and means for returning said condensate to said vaporizer.

2. Apparatus for extracting heat from a hot liquid comprising a hot liquid containing scaling material whose solubility is proportional to the temperature of the liquid, said apparatus comprising:

a) a primary pond containing a liquid;

b) a primary vertical tube located in the pond and having an upper end that is substantially closed, and an open lower end immersed in the water in the pond and spaced from the bottom thereof for establishing a trapped region above a column of liquid in said primary tube;

c) means for supplying said hot liquid to said trapped region;

d) said pond and said tube being constructed and arranged so that the water in the pond and the liquid in said column are in substantial hydrostatic equilibrium;

e) means for maintaining said trapped region at a pressure such that some of the water in the hot liquid supplied to said trapped region flashes into steam thereby concentrating the liquid in the column of liquid, the open lower end of the first tube effecting the passage to the bottom of the pond of scaling material that precipitates as a consequence of the concentration of liquid below the trapped region;

f) a supplemental vertical tube in the primary pond, said supplemental vertical tube having a substantially closed upper end and an open lower end immersed in the pond below the surface thereof and spaced from the bottom of the pond for establishing a supplemental trapped region above a column of liquid in the supplemental tube, said supplemental tube being constructed and arranged in relation to the pond such that the water in the pond and the liquid in the column below the supplemental trapped region are in substantial hydrostatic equilibrium, and means for maintaining the supplemental trapped region under a vacuum such that water in the column of liquid in the supplemental tube is flashed into steam, the open lower end of the supplemental tube effecting the passage to the bottom of the pond of scaling material that precipitates as a consequence of the concentration of liquid below the supplemental trapped region;

g) means for extracting heat from said steam; and h) means for producing electricity including a vaporizer for vaporizing an organic fluid with heat extracted from said steam, a turbogenerator for extracting work from the vaporized organic fluid and producing electricity and heat depleted organic fluid, an organic fluid condenser for condensing the heat depleted organic fluid vapor and producing liquid organic fluid condensate, and means for returning said condensate to said vaporizer.

3. Apparatus for extracting heat from a hot liquid comprising a hot water containing scaling material whose solubility is proportional to the temperature of the liquid, said apparatus comprising:

a) a primary pond containing a water;

b) a primary vertical tube located in the pond and having an upper end that is substantially closed, and an open lower end immersed in the water in the pond and spaced from the bottom thereof for establishing a trapped region above a column of liquid in said primary tube;

c) means for supplying said hot liquid to said trapped region;

d) said pond and said tube being constructed and arranged so that the water in the pond and the liquid in said column are in substantial hydrostatic equilibrium;

e) means for maintaining said trapped region at a pressure such that some of the water in the hot liquid supplied to said trapped region flashes into steam thereby concentrating the liquid in the column, the open lower end of the first tube effecting the passage to the bottom of the pond of scaling material that precipitates as a consequence of the concentration of liquid below the trapped region;

f) a supplemental vertical tube in the primary pond, said supplemental vertical tube having a substantially closed upper end and an open lower end immersed in the pond below the surface thereof and spaced from the bottom of the pond for establishing a supplemental trapped region above a column of liquid in the supplemental tube, said supplemental tube being constructed and arranged in relation to the pond such that the water in the pond and the liquid in the column below the supplemental trapped region are in substantial hydrostatic equilibrium, and means for maintaining the supplemental trapped region under a vacuum such that water in the column of liquid in the supplemental tube is flashed into steam, the open lower end of the supplemental tube effecting the passage to the bottom of the pond of scaling material that precipitates as a consequence of the concentration of liquid below the supplemental trapped region; and g) wherein said supplemental tube in the primary pond is laterally spaced from said vertical tube.

4. Apparatus for extracting heat from a hot liquid comprising a hot water containing scaling material whose solubility is proportional to the temperature of the liquid, said apparatus comprising:

a) a primary pond containing water;

b) a primary vertical tube located in the pond and having an upper end that is substantially closed, and an open lower end immersed in the water in the pond and spaced from the bottom thereof for establishing a trapped region above a column of liquid in said primary tube;

c) means for supplying said hot liquid to said trapped region;

d) said pond and said tube being constructed and arranged so that the water in the pond and the liquid in said column are in substantial hydrostatic equilibrium;

e) means for maintaining said trapped region at a pressure such that some of the water in the hot fluid supplied to said trapped region flashes into steam thereby concentrating the liquid, the open lower end of the primary tube effecting the passage to the bottom of the pond of scaling material that precipitates as a consequence of the concentration of liquid below the trapped region;

f) a supplemental vertical tube in the primary pond, said supplemental vertical tube having a substantially closed upper end and an open lower end immersed in the pond below the surface thereof and spaced from the bottom of the pond for establishing a supplemental trapped region above a column of liquid in the supplemental tube, said supplemental tube being constructed and arranged in relation to the pond such that the water in the pond and the liquid in the column below the supplemental trapped region are in substantial hydrostatic equilibrium, and means for maintaining the supplemental trapped region under a vacuum such that water in the column of liquid in the supplemental tube is flashed into steam, the open lower end of the supplemental tube effecting the passage to the bottom of the pond of scaling material that precipitates as a consequence of the concentration of.liquid below the supplemental trapped region; and g) wherein said supplemental tube in the primary pond is positioned such that it is partly contained in said primary vertical tube.

5. Apparatus for extracting heat from a hot liquid comprising a hot water containing scaling material whose solubility is proportional to the temperature of the liquid, said apparatus comprising:

a) a primary pond containing a water;

b) a primary vertical tube located in the pond and having an upper end that is substantially closed, and an open lower end immersed in the water in the pond and spaced from the bottom thereof for establishing a trapped region above a column of liquid in said primary tube;

c) means for supplying said hot liquid to said trapped region;

d) said pond and said tube being constructed and arranged so that the water in the pond and the liquid in said column are in substantial hydrostatic equilibrium;

e) means for maintaining said trapped region at a pressure such that some of the water in the hot liquid supplied to said trapped region flashes into steam thereby concentrating the liquid in said column, the open lower end of the first tube effecting the passage to the bottom of the pond of scaling material that precipitates as a consequence of the concentration of liquid below the trapped region;

f) a supplemental vertical tube in the primary pond, said supplemental vertical tube having a substantially closed upper end and an open lower end immersed in the pond below the surface thereof and spaced from the bottom of the pond for establishing a supplemental trapped region above a column of liquid in the supplemental tube, said supplemental tube being constructed and arranged in relation to the pond such that the water in the pond and the liquid in the column below the supplemental trapped region are in substantial hydrostatic equilibrium, and means for maintaining the supplemental trapped region under a vacuum such that water in the column of liquid in the supplemental tube is flashed into steam, the open lower end of the supplemental tube effecting the passage to the bottom of the pond of scaling material that precipitates as a consequence of the concentration of liquid below the supplemental trapped region; and g) an inner tube located in said supplemental tube for ensuring that hotter liquid entering the supplemental tube flows substantially near the wall of said supplemental tube and cooler and more dense liquid exiting the supplemental tube flows downwardly through the central portion of said supplemental tube.

6. Apparatus for extracting heat from hot geothermal fluid comprising hot water containing scaling material whose solubility is proportional to the temperature of the water, said apparatus comprising:

a) a primary pond containing a liquid;

b) a primary vertical tube located in the pond and having an upper end that is substantially closed, and an open lower end immersed in the liquid in the pond and spaced from the bottom thereof for establishing a trapped region above a column of liquid in said primary tube;

c) means for supplying said geothermal fluid to said trapped region;

d) said pond and said tube being constructed and arranged so that the liquid in the pond and the liquid in said column are in substantial hydrostatic equilibrium;

e) means for maintaining said trapped region at a pressure such that some of the water in the geothermal fluid supplied to said trapped region flashes into steam thereby concentrating the liquid in the column below the trapped region, the open lower end of the first tube effecting the passage to the bottom of the pond of scaling material that precipitates as a consequence of the concentration of liquid below the trapped region;

f) a settling pond;

g) means for transferring liquid from the primary pond to said settling pond;

h) means for injecting liquid from the settling pond into the ground; and i) a heat exchanger for heating liquid extracted from the settling pond prior to injecting it into the ground.

7. Apparatus according to claim 6 wherein said heat exchanger is supplied with liquid transferred from said primary pond to the settling pond for transferring heat contained therein to liquid extracted from the settling pond.

8. Apparatus for extracting heat from a hot liquid comprising water containing scaling material whose solubility is proportional to the temperature of the water, said apparatus comprising:

a) a primary pond containing water;

b) a primary vertical tube located in the pond and having an upper end that is substantially closed, and an open lower end immersed in the water in the pond and spaced from the bottom thereof for establishing a trapped region above a column of liquid in said primary tube;

c) means for supplying said hot fluid to said trapped region;

d) said pond and said tube being constructed and arranged so that the water in the pond and the liquid in said column are in substantial hydrostatic equilibrium; and e) means for maintaining said trapped region at a pressure such that some of the water supplied to said trapped region flashes into steam thereby concentrating the liquid below the trapped region, the open lower end of the first tube effecting the passage to the bottom of the pond of scaling material that precipitates as a consequence of the concentration of liquid below the trapped region; and f) means for extracting heat from said steam;

g) wherein said means for extracting heat from said steam produces heat depleted steam and condensed heat depleted steam.

9. Apparatus according to claim 8 including a settling pond, means for transferring liquid in the primary pond to a settling pond, and a pump for injecting liquid from the settling pond into the ground.

10. Apparatus according to claim 9 including a heat exchanger upstream of said pump for heating liquid extracted from the settling pond prior to injecting it into the ground.

11. Apparatus according to claim 10 wherein said heat exchange is supplied with that depleted steam for transferring heat contained therein to liquid extracted from the settling pond.

12. Apparatus according to claim 10 wherein said heat exchanger is supplied with condensed heat depleted steam for transferring heat contained therein to liquid extracted from the settling pond.

13. Apparatus for extracting heat from a hot liquid comprising water containing scaling material whose solubility is proportional to the temperature of the water, said apparatus comprising:

a) a primary pond containing a liquid;

b) a primary vertical tube located in the pond and having an upper end that is substantially closed, and an open lower end immersed in the liquid in the pond and spaced from the bottom thereof for establishing a trapped region above a column of liquid in said primary tube;

c) means for supplying said hot fluid to said trapped region;

d) said pond and said primary tube being constructed and arranged so that the liquid in the pond and the liquid in said column are in substantial hydrostatic equilibrium; and e) means for maintaining said trapped region at a pressure such that some of the liquid supplied to said trapped region flashes into steam thereby concentrating the liquid in said column, the open lower end of the first tube effecting the passage to the bottom of the pond of scaling material that precipitates as a consequence of the concentration of liquid below the trapped region;

f) a supplemental vertical tube in the primary pond, said supplemental vertical tube having a substantially close upper end and an open lower end immersed in the pond below the surface thereof and spaced from the bottom of the pond for establishing a supplemental trapped region above a column of liquid in the supplemental tube, said suppplemental tube being constructed and arranged in relation to the pond such that the liquid in the pond and the liquid in the column below the supplemental trapped region are in substantial hydrostatic equilibrium, and means for maintaining the supplemental trapped region under a vacuum such that liquid in the supplemental tube is flashed into vapor, the open lower end of the supplemental tube effecting the passage to the bottom of the pond of scaling material that precipitates as a consequence of the concentration of liquid below the supplemental trapped region; and g) means for extracting heat from said steam thereby producing heat depleted steam and condensed heat depleted steam.

14. Apparatus according to claim 13 including a settling pond, means for transferring liquid in the primary pond to a settling pond, and means for injecting liquid from the settling pond into the ground.

15. Apparatus according to claim 14 including a heat exchanger for heating liquid extracted from the settling pond prior to injecting it into the ground.

16. Apparatus according to claim 15 wherein said heat exchanger is supplied with that depleted steam for transferring heat contained therein to liquid extracted from the settling pond.

17. Apparats according to claim 15 wherein said heat exchanger is supplied with condensed heat depleted steam for transferring heat contained therein to liquid extracted from the settling pond.

18. Apparatus for extracting heat from a hot liquid comprising a hot liquid containing scaling material whose solubility is proportional to the temperature of the liquid, said apparatus comprising:

a) a primary pond containing a liquid;

b) a vertical tube located in the pond and having an upper end that is substantially closed, and an open lower end immersed in the liquid in the pond and spaced from the bottom thereof for establishing a trapped region above a column of liquid in said primary tube;

c) means for supplying said hot fluid to said trapped region;

d) said pond and said tube being constructed and arranged so that the liquid in the pond and the liquid in said column are in substantial hydrostatic equilibrium; and e) means for maintaining said trapped region at a pressure such that some of the liquid supplied to said trapped region flashes into a vapor thereby concentrating the liquid in said column, the open lower end of the first tube effecting the passage to the bottom of the pond of scaling material that precipitates as a consequence of the concentration of liquid in the column;

f) a settling pond;

g) means for transferring liquid from the primary pond to said settling pond; and h) means for injecting liquid from the settling pond into the ground.

19. Apparatus for extracting heat from a hot liquid comprising water containing scaling material whose solubility is proportional to the temperature of the water, said apparatus comprising:

a) a primary pond containing water;

b) a primary vertical tube located in the pond and having an upper end that is substantially closed, and an open lower end immersed in the water in the pond and spaced from the bottom thereof for establishing a trapped region above a column of liquid in said primary tube;

c) means for supplying said hot fluid to said trapped region;

d) said pond and said tube being constructed and arranged so that the liquid in the pond and the liquid in said column are in substantial hydrostatic equilibrium; and
e) means for maintaining said trapped region at a pressure such that some of the liquid supplied to said trapped region flashes into steam thereby concentrating the liquid in said column, the open lower end of the first tube effecting the passage to the bottom of the pond of scaling material that precipitates as a consequence of the concentration of liquid in said column;
f) a supplemental vertical tube in the primary pond, said supplemental vertical tube having a substantially closed upper end and an open lower end immersed in the pond below the surface thereof and spaced from the bottom of the pond for establishing a supplemental trapped region above a column of liquid in the supplemental tube, said supplemental tube being constructed and arranged in relation to the pond such that the liquid in the pond and the liquid in he column below the supplemental trapped region are in substantial hydrostatic equilibrium; and
g) means for maintaining the supplemental trapped region under a vacuum such that liquid in the supplemental tube is flashed into steam, the open lower end of the supplemental tube effecting the passage to the bottom of the pond of scaling material that precipitates as a consequence of the concentration of liquid below the supplemental trapped region.

20. A method for extracting heat from a hot fluid comprising a hot liquid containing scaling material whose solubility is proportional to the temperature of the liquid, said method comprising the steps of:
a) providing a pond containing a liquid;
b) locating in said pond a vertical tube having an upper end that is substantially closed, and an open lower end that is immersed in the liquid in the pond and spaced from the bottom thereof for establishing a trapped region above a column of liquid in the said tube;
c) supplying said hot fluid to said trapped region; and
d) said pond and said tube being constructed and arranged so that the liquid in the pond and the liquid in said column are in substantial hydrostatic equilibrium, and said trapped region is maintained at a pressure such that some of the liquid supplied to said trapped region flashes into a vapor thereby concentrating the liquid below the trapped region;
e) the open lower end of the first tube effecting the passage to the bottom of the pond of scaling material that precipitates as a consequence of the concentration of liquid below the trapped region; and
f) reinjecting liquid from the pond to the ground.

* * * * *